United States Patent Office 3,546,857
Patented Dec. 15, 1970

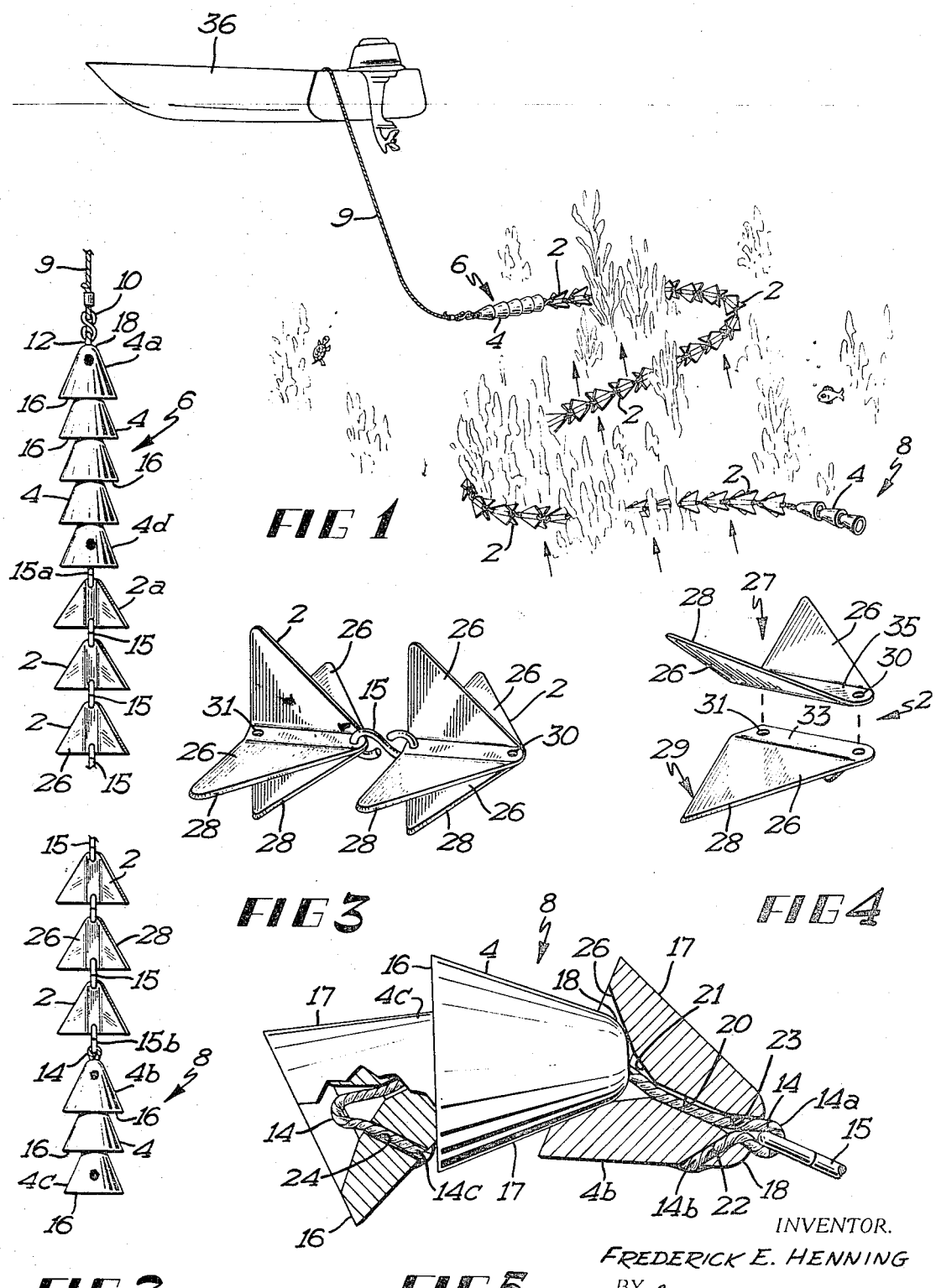

3,546,857
WATER WEED MOWER COMPRISING A CONTINUOUS CABLE OF WEIGHT AND CUTTER SECTIONS
Frederick E. Henning, 1638 8th Ave. S.,
Fargo, N. Dak. 58102
Filed July 18, 1968, Ser. No. 745,858
Int. Cl. A01d 45/08
U.S. Cl. 56—8                                       5 Claims

ABSTRACT OF THE DISCLOSURE

A mower for cutting weeds from the bottom of lakes and rivers having a plurality of pivotally linked cutters connected to a group of longitudinally spaced weights disposed forwardly and rearwardly of said cutters to thereby form a continuous, elongated, flexible mower which may be drawn behind a boat by means of a cable attached to the forward group of weights. Both the weights and the cutters are generally conically-shaped in order that they may easily pass through weeds without the weeds becoming entangled and caught thereon, each of the cutters consisting of a plurality of planar blades equally spaced in a symmetrical pattern. The individual weights are held closely together in abutting relationship with each other by means of a cable extending through a hole drilled lengthwise thereof, and each of the weights has a recess in its base within which the conical nose of the following weight is pivotally received.

BACKGROUND OF THE INVENTION

Because of the rapid and spreading growth of weeds and various types of underwater vegetation in lakes and streams, there is an immediate need for some type of mowing apparatus by means of which underwater weeds may be quickly and completely removed. Unless weed growth is controlled by systematically cutting the weeds from lake and river bottoms, many recreational bodies of water will be rapidly converted into weedy swamps, spoiling bathing beaches, fishing and boating and contaminating both the lake and river bottoms as well as the surrounding atmosphere with decaying vegetation. Although various types of cutters and mowing devices have been proposed for cutting underwater vegetation, there is, to my knowledge, no presently-available cutting apparatus and method particularly well suited for the rapid removal of contaminating vegetation from lake and river bottoms. The schemes proposed for cutting weeds from bathing beaches by manually dragging cutters through shallow water are of course not feasible for cutting weeds from entire lake beds by the use of power boats; and the cutting devices which have been designed to be towed behind boats have employed cutter arrangements which suffer from the disadvantages of being able to only cut a narrow path of weeds at a time or are particularly susceptible to being caught and snagged on rocks and other underwater obstacles.

BRIEF SUMMARY OF THE INVENTION

Having in mind the need for a mowing device and process by means of which weeds may be rapidly removed from lakes and river beds, and being aware of the shortcomings associated with known weed-cutting devices, I have developed an apparatus and method for mowing weeds particularly characterized by extremely rapid cutting action and avoidance of entanglement and snagging on heavy weed beds, tree roots, rocks and other underwater obstacles.

These basic objectives are realized by employing an elongated, flexible mower comprised of a plurality of pivotally connected cutters and a series of weights connected to the forward and rear ends of the cutters, the forward group of weights being connected to a tow boat by means of a flexible cable. The weights serve to hold the chain of cutters on the bottom of a lake or river, and as the towing boat is driven in a zigzag path, the long, flexible mower assumes a serpentine pattern and cuts wide stretches of weeds as it is towed therethrough.

A particularly advantageous feature of my improved weed mower resides in the utilization of conically-shaped weights which are held together in closely abutting relationship by means of a cable extending therethrough, the rearwardly and outwardly tapering conical weights permitting them to freely pass through heavy weed beds and guide the weeds onto the following cutters. A conical recess in the base of each weight receives the abutting, conical nose portion of the next adjoining weight, whereby the weights may swivel freely with respect to each other so as to provide a flexible string of weights which may turn with the direction of the towing vehicle.

As a further beneficial aspect of my weed mower, I utilize cutters having a plurality of equally spaced, rearwardly tapering planar blades arranged in a symmetrical, generally conical configuration. This arrangement insures that one cutting blade will always be turned transversely with respect to the weeds to be mowed, and that heavy weeds which are not cut by one cutter will be directed by the conically-shaped cutter rearwardly onto the following cutter for severance thereby.

These and other objects and advantages of my invention will become readily apparent as the following description is read in conjunction with the accompanying drawings wherein like reference symbols have been employed to designate like elements throughout the several views.

BRIEF DESCRIPTION OF THE DRAWINGS

FIG. 1 is a schematic, perspective view showing my improved weed mower being towed through a weed bed in a lake or river;

FIG. 2 is a top, plan view of my flexible weed mower showing a plurality of cutters and weights connected together;

FIG. 3 is an enlarged, fragmentary perspective view showing two cutters and the manner in which they are linked together;

FIG. 4 is an exploded, perspective view showing the manner in which the cutters are assembled from two separate pieces; and FIG. 5 is an enlarged, side elevation view of the weight section of my mower, two of the weights being shown in section to illustrate the manner in which they are connected together.

In keeping with my primary purpose to provide a weed mower which may be drawn at a relatively high rate of speed through weed beds on lake and river bottoms, I have designed an elongated, flexible mower which may be drawn behind a boat without fear that any portion of the mower apparatus will become caught or entangled on underwater obstacles. As may be best understood by reference to FIG. 2, my improved mower 1 is comprised of a plurality of cutters 2 linked together with longitudinally extending weights 4 assembled in a forward weight group 6 and a trailing weight group 8, the entire assembly of cutters 2 and weights 4 forming a flexible, continuous mower chain. The most forwardly disposed weight 4a of forward weight group 6 is connected to a cable 9 by link 10 coupled to cable strand 12 on which forward weights 4 of group 6 are assembled. Weights 4 of trailing or rearwardly disposed weight group 8 are assembled on a cable strand 14, the manner in which weights 4 of either group 6 or 8 are assembled on their respective cable lengths 12 and 14 being clearly illustrated in FIG. 5.

Weights 4 of groups 6 and 8 are identical in size and shape, and, as may be seen with reference to weights 4 of group 8 shown in FIG. 5, are of substantially conical configuration. Each of the weights 4 has a base portion 16, and a conical nose portion 18 which is disposed forwardly with respect to the direction of mower travel. This particular shaping and orientation of weights 4 insures that they will readily shed weeds and various types of underwater vegetation as they are pulled therethrough by a tow cable 9. The ability of tapered weights 4 to freely pass through weeds and guide them rearwardly and outwardly is particularly helpful with respect to forwardweight group 6, the weights 4 in this group serving to deflect weeds in position to be severed by cutters 2. As is indicated in FIG. 5, weights 4 are assembled on a length of cable, which is designated by numeral 14, with respect to the weights of trailing group 8. Weights 4 are preferably iron castings, and are provided with a longitudinally extending passage 20 through which cable 14 extends. Cable 14 is looped at its forward end 14a around a link 15, and free end strand 14b is guided into transverse passage 22 of weight 4b. End strand 14b is held in place by solder or babbitt metal which is fused to strand 12 and the outer end of passage 22. Cable 14 extends rearwardly through longitudinal holes 20 in each of the weights 4, and is fastened to the rear or trailing weight 4c by using solder to secure end strand 14c in transverse passage 24 thereof in the same manner as is done with respect to front end strand 14b. Weights 4 are positioned closely together in abutting relationship one with the other in the arrangement shown with FIG. 5 so that there will be no free length of cable therebetween upon which weeds or other obstacles could become caught or entangled. Cable strand 12 would be extended through and attached to forwardly disposed weights 4 of group 6 in the same way as described above with respect to cable 14 and trailing weight group 8. Cable 12 would be looped at its forward end for attachment to link 10, and a loop at its rear end attached to weight 4d would provide the mode of connection to link 15a to which leading cutter 2a is attached.

Each of the weights 4 is provided with a conical socket or recess 26 in its base end 16, within which the conical nose portion 18 of the following weight is received. A ball and socket type of joint is thus provided between each of the weights 4, so that they may swivel freely with respect to each other, thereby insuring a completely flexible weight segment at 6 and 8. Weights 4 are preferably only three or four inches long, and are relatively narrow. The use of such a plurality of relatively small weights free to swivel with respect to each other has a particular advantage in that the weight segments 6 and 8 of my mower will easily move around or over submerged obstacles such as tree roots, logs and rocks without becoming caught thereon and causing cable 9 to break as might well be the case if only one or two relatively large weights were used. Also, as appears most clearly with respect to weight 4b shown in FIG. 5, longitudinal passage 20 is enlarged and beveled at its opposite ends 21 and 23 so that as weights 4 swivel with respect to each other, cable 14 will not rub or bind against the opposite ends of passage 20. Excessive wear and fatigue failure of cable strands 14 and 12 is thus prevented.

Referring now to FIG. 3, each of the cutters 2 is preferably comprised of a plurality of equally spaced planar blade segments 26 having cutting edges 28 which angle rearwardly and outwardly. Edges 28 of cutting blades 26 are sharpened, and may be serrated to improve their cutting action. Blade segments 26 are angularly disposed with respect to each other in the symmetrical arrangement shown in FIG. 3 so as to thereby provide cutting units 2 of generally conical configuration. Conically-shaped, rearwardly tapering cutters 2, like cone-shaped weights 4, will move smoothly and easily through heavy weed beds without being caught thereon, and if a particularly large weed stem is not completely severed by one of the cutters 2, the weed will be brushed aside and the cutting operation will be completed by the following cutter. Cutters 2 are pivotally joined together by links 15 which loop through holes 30 and 31 provided at the front and rear end of each of the cutter units. The shape of cutters 2, and the type of links 15 used to connect them prevents cutters 2 from becoming entangled with each other when the entire mower unit 1 is coiled up in a boat or other storage place. Links 15 are of such a design as to permit some slight rotation of adjacent cutters 2 with respect to each other, but not such a complete spiraling of the cutters that would cause weeds to wrap around them.

Cutters 2 are preferably constructed from 18 gauge steel and may obviously be made in various ways. I have found that cutters 2 can be easily and economically constructed by shearing and press-forming two separate pieces of sheet metal 27 and 29 to the desired shape, as is indicated in FIG. 4, and then spot welding these two separate pieces together along their base portions 33 and 35. It would be possible to provide cutters 2 with round blades, or with an additional set of rearwardly disposed blade segments complementary to blade segments 26 to permit the cutters to sever weeds while being pulled through the water in any direction.

Any number of cutters 2 may be linked together and joined to forward and trailing weight sections 6 and 8 in the aforesaid manner in order to provide a flexible mower unit 1 of the proper length to accomplish the weed-cutting operation in a particular body of water of known depth. As many as 120 cutters might be connected together to provide a cutting section 30 or 40 feet long for mowing tall weeds in deep water. In operation, tow cable 9 will be connected to a towing vehicle, such as boat 36 shown in FIG. 1, and when the boat starts moving mower 1 will be dumped overboard and stretch out behind the boat. Because of the swivel socket action between abutting weights 4, and the pivotal connection between links 2, the entire mower chain 1 will be flexible, and will therefore automatically follow the contour of the water bed. Thus, weeds and various undesired underwater vegetation will be cut off right at their roots regardless of whether the mower is being towed through shallow or deep water. Large areas of submerged weeds can be removed in a relatively short period of time by driving boat 36 at a fairly high rate of speed in a zigzag, semicircular forward motion. This will cause flexible mower chain 1 to assume a serpentine pattern behind boat 36 in the manner shown in FIG. 1, and the tendency of the mower chain to attempt to straighten out as the boat makes turns will cause relatively long sections of cutters 2 to be drawn generally transversely through weed beds in wide cutting swaths. The direction which the straight length of cutter sections will take in attempting to follow the boat is indicated by directional arrows in FIG. 1. Forwardly and rearwardly disposed weight groups 6 and 8 serve to hold cutters 2 taut therebetween, and to keep the entire cutting section comprised of cutters 2 on the lake or river bottom. The symmetrical arrangement of blade segments 26 insures that at least one blade segment will always be disposed in proper, transverse cutting position with respect to the weeds being cut even though blades 2 may spin or rotate as they strike submerged objects. Also, when boat 36 changes direction, the blade 26 disposed oppositely from the blade segment which had previously been doing the weed cutting will be in position to continue the cutting action. By virtue of the flexibility of mower 1 throughout its length, and the conical shape of cutters 2 and weights 4, mower 1 can be pulled over and around logs, rocks and other solid obstacles without fear of either the cutters 2 or weights 4 becoming caught or entangled thereon. I have found that by towing mower 1 in the aforesaid zigzag pattern, I am able to mow at least five acres of subterranean weed beds per day.

The particular embodiment of my improved weed mower which I have shown and described is intended to be illustrative only. I contemplate that various changes could be made, especially in the shape and construction of weights 4 and cutters 2 without losing the benefits to be realized by employing the basic concept of a long, flexible mower unit comprised of a plurality of cutters and weights pivotally interconnected. For example, weights 4 and cutters 2 could be given a planar, triangular configuration rather than a conical shape, and they would still be able to shed weeds. Various other changes may be made in the size, details, arrangement and proportions of the various parts without departing from the spirit and scope of my invention as defined by the following claims.

What I claim is:

1. An elongated, flexible weed mower for cutting weeds growing in lakes and rivers comprising:
   a flexible cable comprising a forward end, adapted to be attached to a boat, and a rearward end;
   a first plurality of weight elements attached to said forward end and held in swiveling relation to each other on a cable strand extending therethrough to thereby provide a flexible length of weights, said weight elements being assembled in end to end abutting relation on said cable strand and tapering rearwardly and outwardly along the length of said flexible mower, whereby weeds will be readily shed by said first plurality of weight elements;
   a plurality of cutters connected to said weight elements and extending rearwardly therefrom, said cutters being pivotally linked to each other end to end to form a continuous, elongated and flexible cutter section;
   weight means connected to said cutter section at the rear end thereof, said weight elements and weight means serving to hold said cutters taut therebetween on the bottom of a body of water.

2. The weed mower as defined in claim 1 wherein:
   each of said cutters comprises a plurality of spaced apart, substantially planar cutting blades located in planes angularly disposed with respect to each other in a symmetrical pattern to insure that at least one of said blades will always be disposed in proper, transverse cutting position with respect to the weeds being cut, and said blades being of triangular shape with the outermost cutting edges of each of said blades angling rearwardly and outwardly whereby each of said cutters will thereby assume an overall conical configuration.

3. A weed mower as defined in claim 1 wherein:
   each of said weight elements is provided with a longitudinal passage through which said cable strand extends, said pasages being beveled at the opposite ends thereof to prevent binding and wear on said cable strand as said weight elements swivel with respect to each other.

4. A weed mower as defined in claim 1 wherein:
   each of said weight elements is substantially conically-shaped and is provided with a recess in its base within which the conical nose portion of the following weight element is received and is free to swivel.

5. A weed mower as defined in claim 1 wherein:
   said weight means connected rearwardly of said cutter section comprises a plurality of separate, abutting weight members which taper rearwardly and outwardly.

References Cited
UNITED STATES PATENTS

| | | | |
|---|---|---|---|
| 497,962 | 5/1893 | D'Ivernois | 43—44.81 |
| 804,218 | 11/1905 | Fieldler | 272—81 |
| 2,949,003 | 8/1960 | Wilcox | 56—8 |
| 3,133,395 | 5/1964 | Farmer | 56—8 |

LOUIS G. MANCENE, Primary Examiner

J. N. ESKOVITZ, Assistant Examiner